June 27, 1944.  H. ZIEBOLZ ET AL  2,352,584
APPARATUS FOR CONTROLLING THE RATIO OF THE
FLOWS OF TWO FLUIDS THROUGH CONDUITS
Filed Nov. 4, 1940  2 Sheets-Sheet 1

Inventor
Herbert Ziebolz &
John C. Vaaler

By A. D. Adams

Attorney

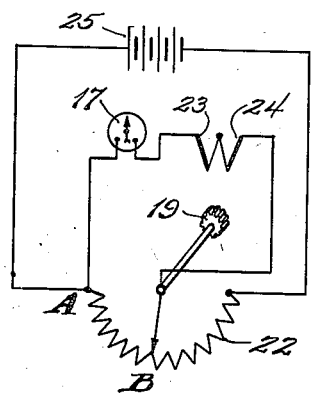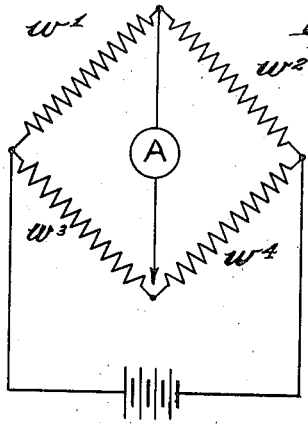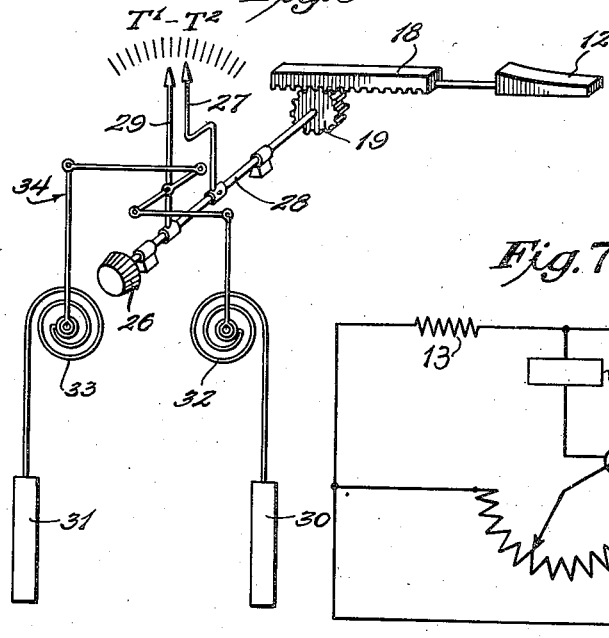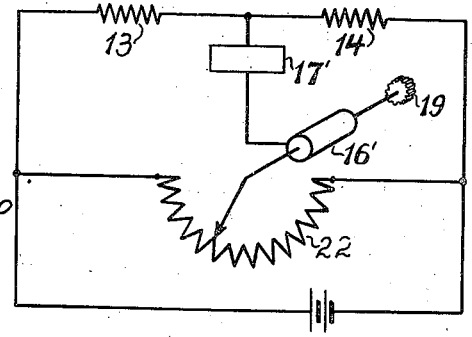

Patented June 27, 1944

2,352,584

UNITED STATES PATENT OFFICE 2,352,584

APPARATUS FOR CONTROLLING THE RATIO OF THE FLOWS OF TWO FLUIDS THROUGH CONDUITS

Herbert Ziebolz, Chicago, and John C. Vaaler, Highland Park, Ill., assignors to Askania Regulator Company, Chicago, Ill., a corporation of Illinois Application November 4, 1940, Serial No. 364,336

7 Claims. (Cl. 137—164)

The present invention relates to apparatus for controlling the ratio of the flows of two fluids through conduits and, more particularly, to apparatus for controlling a constant ratio of weight of two fluids by compensating for variations in the respective fluid temperatures.

It is an object of the invention to utilize resistance thermometers or thermocouples in a Wheatstone bridge circuit or mechanical temperature indicators to determine the necessary correction factor. It is a further object of the invention to so construct and arrange the apparatus in relation to the resistance thermometers, thermocouples or temperature indicators that the latter in cooperation with a ratio varying device and means to adjust the ratio varying device as to maintain a substantially constant ratio of weight flows as the absolute temperature of at least one fluid changes.

Further objects and aims of this invention will appear more fully from a consideration of the description which follows, together with the accompanying drawings which show, by way of example, one form of the apparatus and several forms of the circuit.

In the drawings:

Fig. 4 is a circuit diagram with thermocouples illustrating a method for measuring temperature differences;

Fig. 5 is a circuit diagram showing a general Wheatstone bridge arrangement;

Fig. 6 is a diagrammatic view illustrating a differential temperature thermometer; and Fig. 7 is a diagrammatic illustration showing an ordinary motor in the circuit.

Figure 1:
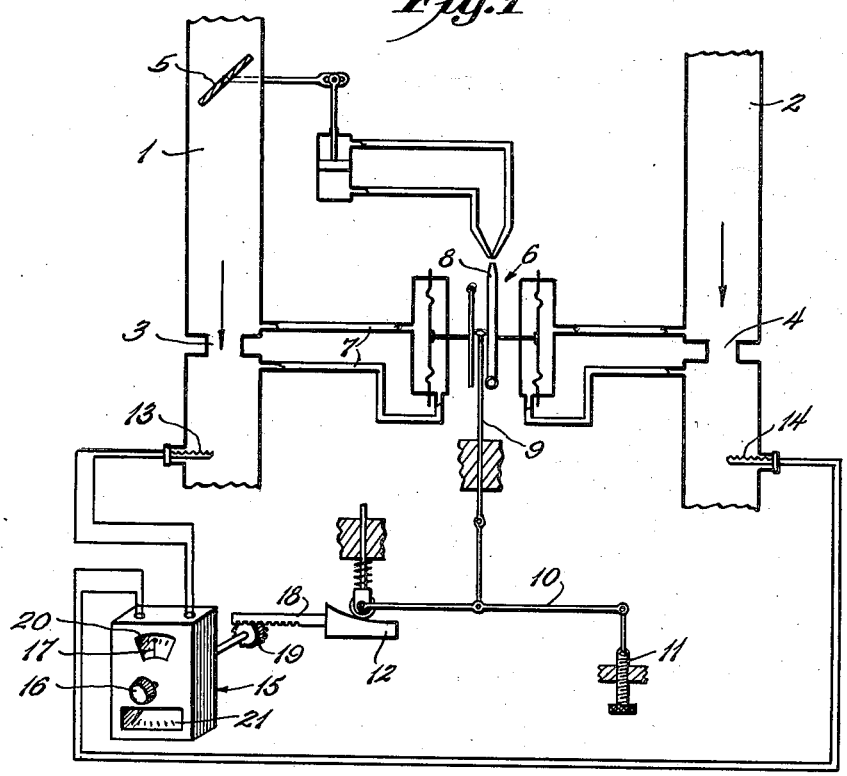
Fig. 1 is a diagrammatic view of the apparatus with the Wheatstone bridge circuit.

In the present example, ratio controls are employed to proportion the rates of flow in two conduits. It is well known that the rate of flow of a fluid can be measured by means of the pressure drop across an orifice placed in the conduit. The volumetric rate of flow V may be expressed by the equation $$V = C\sqrt{h/\gamma}$$

wherein C represents a constant, depending upon the orifice design, including its area; $h$ represents the pressure drop across the orifice, which varies with the rate of flow; and $\gamma$ represents the density of the fluid.

If $V$, $C$, $h$, and $\gamma$ represent volume of flow, orifice constant, head and density, respectively, in one flow line and $V_2$, $C_2$, $h_2$ and $\gamma_2$ represent volume of flow, orifice constant, head and density, respectively, in a second flow line; then the ratio between the volumetric flows may be expressed as $$\frac{V_1}{V_2} = \frac{C_1}{C_2} \cdot \frac{\sqrt{\gamma_2}}{\sqrt{\gamma_1}} \cdot \frac{\sqrt{h_1}}{\sqrt{h_2}}$$

and on this basis a volumetric ratio flow controller may be designed. If the values of $C_1$, $C_2$, $\gamma_1$, and $\gamma_2$ are maintained constant, a constant volumetric ratio can be obtained by maintaining $$\frac{\sqrt{h_1}}{\sqrt{h_2}}$$

constant.

All present designs of volumetric ratio controls use this principle. For instance, as shown in Patent No. 1,558,529, two differential pressures are directly balanced against each other. Provisions are made—as also described in said patent—to vary the ratio $$\frac{\sqrt{h_1}}{\sqrt{h_2}}$$

by means of a mechanical device which changes the mechanical lever-ratio between the flow impulse systems. As chemical reactions, however, follow definite laws of weight relations rather than volumetric ratios, the above method is only correct if the density values remain constant. It is especially important to make a correction for varying temperatures of gas and air in case both or either one changes in relatively wide ranges. This is the case not only for combustion controls measuring preheated air or gas, but also for combustion controls with wide variations of the air temperatures.

The law determining the weight per time unit is equal to $G = V \cdot \gamma$ or $G_1 = V_1 \cdot \gamma_1 = C_1 \cdot \sqrt{h_1} \cdot \sqrt{\gamma_1}$ and $G_2 = V_2 \cdot \gamma_2 = C_2 \cdot \sqrt{h_2} \cdot \sqrt{\gamma_2}$ using the above equation. Numerals 1 and 2 designate the respective conduits with $G_1$ and $G_2$ representing the respective rates of weight flow therethrough. A constant ratio of weights is therefore obtained between the two weight flows $G_1$ and $G_2$, if the relationship $$\frac{G_1}{G_2} = \frac{C_1}{C_2} \cdot \frac{\sqrt{h_1}}{\sqrt{h_2}} \cdot \frac{\sqrt{\gamma_1}}{\sqrt{\gamma_2}}$$

is maintained. This can be done by correcting for variations in the volume of flow in the conduits 1 and 2 using an ordinary volumetric ratio control. The factor $\gamma_1/\gamma_2$ therefore needs special attention. In accordance to the well known laws of gas behavior, the relation is as follows $$\frac{P_1}{\gamma_1} = R \cdot T_1$$

In this equation, R is a constant, $P_1$ the absolute pressure, $\gamma_1$=density and $T_1$ absolute temperature. For the two gases the following is true: $P_1/\gamma_1 = R_1 \cdot T_1$, $P_2/\gamma_2 = R_2 \cdot T_2$, where the factor 1/gamma of course represents the specific volume of the corresponding gases. If it is assumed that $P_1$ and $P_2$ are constants and only the temperatures vary, the ratio $\gamma_1/\gamma_2$ becomes $$\gamma_1/\gamma_2 = c \cdot \frac{T_2}{T_1}$$

It is therefore obvious that the ratio of the densities is inversely proportional to the ratio of the absolute temperatures.

The problem is therefore to find a measurement of the ratio $$\frac{T_1}{T_2}$$

This can be accomplished, for instance, by using resistance thermometers in a Wheatstone bridge circuit. Balance of the Wheatstone bridge is obtained if $$\frac{W_1}{W_2} = \frac{W_3}{W_4}$$

(See Fig. 5.) If $W_1$ and $W_2$ are resistance type thermometers, which measure the respective temperatures of the two fluids, there is obtained $$W_1 = C_1 \cdot T_1$$
$$W_2 = C_2 \cdot T_2$$

or $$\frac{W_3}{W_4} = C \cdot \frac{T_1}{T_2}$$

The letters C represent constants of proportionality between the value of the resistance of the thermometer and the temperature. In other words, in a potentiometer circuit the position of the sliding contact A, (Fig. 5), which represents $$\frac{W_3}{W_4}$$

is the desired indication for the ration of the $$\frac{T_1}{T_2}$$

(absolute temperatures) and therefore also of their root value $$\sqrt{\frac{T_1}{T_2}}$$

This however is the factor which is needed in the equation for compensation to maintain a constant weight ratio. The invention consists therefore in the realization of the foregoing relations and in the combination of a potentiometer to determine the correction factor $$\sqrt{\frac{T_1}{T_2}}$$

and in the use of this potentiometer indication for changing the ratio-adjustment of the ratio slider of a standard volumetric ratio control.

Referring now to Fig. 1, the two gases or fluids of which the ratio of the flows is to be controlled, flows in the conduits 1 and 2 in which restriction orifices 3 and 4 are provided. A control valve 5 in the conduit 1 is operated by a ratio regulator 6 of a type as for instance disclosed in Patent No. 1,558,529, issued October 27, 1925, by means of the pipes 7 connected in front of and in back of the orifices 3 and 4. An increase in differential pressure across the orifice 4 moves the jet pipe 8 to the left and opens the valve 5 until balance between the differential pressure across 3 and the differential across 4 is restored.

The ratio slider 9 is connected to a whiffle-tree 10 which summarizes the movements of the ratio adjuster 11 and the stroke caused by the movement of the cam 12. As the ratio stroke characteristic of the slider 9 is for all practical purposes identical with a logarithmic curve (as shown in Patent No. 2,222,551, issued Nov. 11, 1940), it is possible to introduce a plurality of factors by a mechanical summarizing as shown in the whiffle-tree arrangement. The ratio varying device can, of course, be set in accordance with the readings and may be mechanically connected to the resistance ratio varying device. In this instance, the ratio slider is also connected to be operated by the resistance varying mechanism. However, it is obvious that it may be manually operated in accordance with the reading on the bottom dial 21.

While the adjuster 11 is used to change the ratio of flows, the cam 12 is used to multiply this ratio setting with a factor which is a function of the absolute temperature ratios ($T_1$) and ($T_2$). These temperatures are shown to be measured by resistancetype thermometers 13 and 14 in the respective conduits 1 and 2, the resistance of which changes directly proportional to the absolute temperatures $T_1$ and $T_2$.

A standard type potentiometer 15 is utilized having a handwheel 16. As soon as the galvanometer 17 shows zero current the position of the handwheel 16 gives an indication of $$\frac{T_1}{T_2}$$

and this position can be used to introduce the necessary correction factor by connecting the handwheel 16 to the cam 12 by means of a rack 18 and pinion 19. All the operator has to do, therefore, is to keep the galvanometer circuit as indicated by the scale 20 by keeping the pointer of the galvanometer 17 on the zero value. This can also be accomplished by means of a self-balancing potentiometer which thus makes the entire mechanism fully automatic. As these potentiometers are standard equipment of the industry, it is not necessary to illustrate or refer to them further.

It is of course possible to eliminate connections 18 and 19 and the cam 12 and use a dial 21 which indicates the correction factor. Instead of the cam 12, a second handwheel can be provided which carries a corresponding calibration. After determining the value at 21, a second handwheel (not shown), will be set for the correction factor.

Figure 2:
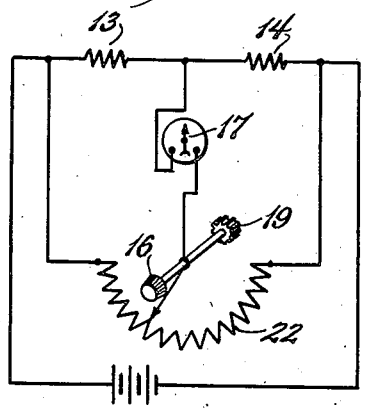
Fig. 2 is a circuit diagram of the Wheatstone bridge using resistance thermometers.

Fig. 2 shows the wiring diagram for a Wheatstone bridge in which the resistance type thermometers 13 and 14 are in two branches thereof and the variable resistance or resistances 22 is adjusted by the handwheel 16 to maintain the galvanometer 17 on zero.

Figure 3:
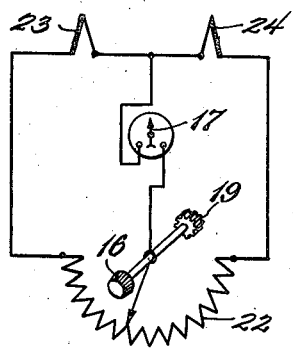
Fig. 3 is a circuit diagram of the Wheatstone bridge using thermocouples.

Fig. 3 shows thermocouples 23 and 24 which are provided in the conduits 1 and 2 respectively, in place of the resistance thermometers, constituting the two branches of the Wheatstone bridge. The current in this case is again proportional to the ratio of the temperatures of the gas flows in the two conduits. Therefore, the setting of the variable resistance controller will read in terms of the absolute temperatures of the two fluids.

Fig. 4 illustrates a circuit with thermocouples 23 and 24 for measuring temperature differences. The battery 25 supplies current to the rheostat 22 and the galvanometer 17 measures the electromotive force between the points (A) and (B). If the galvanometer 17 indicates zero current, the E. M. F. is equal to the difference of the E. M. F. of the thermocouples.

A simplification is possible if it is not possible to use the Wheatstone bridge circuit. In case instruments for measuring the temperature differential as shown in Fig. 4 are used, or temperature differential instruments using bulb thermometers which indicate directly the temperature differential, it is possible to obtain the correction factor approximately from the temperature differential rather than from the ratio of the absolute temperature.

Although theoretically this is not correct, it is in many cases close enough, especially if the temperature variations are not very great, and the temperatures are measured at approximately atmospheric temperature conditions.

The following table shows the magnitude of the theoretically correct correction factor, and at the same time, the magnitude of the approximate correction factor based on the temperature differential. It is assumed that the ratio control is built for a correction factor of one or both temperatures being 70 degrees F.

ASSUMING RATIO CONTROL BUILD FOR $T_1=T_2=70°$ F.
FACTOR FOR $T_2=T_1=70°$ EQUAL=1

| $T_1$, °F | −10 | +10 | +30 | +50 | +70 | +90 | +110 |
|---|---|---|---|---|---|---|---|
| Correct factor based on $\frac{T_1}{T_2}$ | 1.178 | 1.128 | 1.081 | 1.040 | 1 | 0.963 | 0.930 |
| Approximate factor based on $T_2-T_1$ | 1.151 | 1.113 | 1.076 | 1.038 | 1 | 0.962 | 0.925 |

It is evident that, depending on the accuracy required, and the total range to be covered, the use of the temperature differential is in may cases sufficient for practical purposes.

Making an adjustment of the ratio in proportion to the temperature differential as indicated by an instrument is to be considered as part of this invention.

The mechanism, as shown, would still be the same. Only the galvanometer would show temperature differentials instead of ratio of absolute temperatures. If no electrical instrument is used, a design as shown in Fig. 6 can be used. In this figure a differential temperature thermometer is shown reading directly in terms of the temperature differential. A manual knob 26, which is connected to a second pointer 27 fast on the shaft 28 can be moved in such a way that the pointer can be made to coincide with or lie directly behind a temperature differential indicating pointer 29 rotatably mounted on the shaft 28. The knob 26 also cooperates with the cam 12 through pinion 19 and rack 18, the mechanism functioning in the same manner as the one shown in Fig. 1. The bulb thermometers 30 and 31, which are located in the conduits 1 and 2 are connected to the helical capillary steel pressure springs or tubes 32 and 33 respectively and then in turn are connected to the pointer 29 by a suitable linkage 34. Thus, the difference in movement of the helical springs or tubes indicates the temperature differential.

Fig. 7 shows a modified form of controller wherein a motor 16' is arranged in the circuit to adjust the ratio varying means automatically in response to changes in the absolute temperatures of the gases. This figure is somewhat similar to Fig. 4. However, the indicating device 17 of Fig. 4 is replaced by an ordinary temperature controller 17' which controls the operation of the motor. Obviously, the controller will be set to maintain the desired ratio with the bridge circuit balanced. Changes in the resistances will then act to control the operation of the motor automatically to restore the bridge balance and change the setting of the ratio varying means.

It is believed that the operation of the apparatus is perfectly obvious from the foregoing, since the functions and operations have been referred to in describing the various individual devices.

Obviously, the present invention is not restricted to the particular embodiments herein shown and described. Moreover, it is not indispensable that all the features of this invention be used conjointly, since they may be employed advantageously in various combinations and subcombinations.

What is claimed is:

1. Apparatus for controlling the ratio of the flows of two fluids through conduits, comprising means connected to be operated by changes in the flows of the fluids to maintain the volumetric ratio substantially constant; a ratio varying device associated with said means; temperature responsive means exposed to the respective fluid flows; and means associated with said temperature responsive means to adjust the ratio varying device to maintain a substatially constant ratio of weight flows as the absolute temperature of at least one fluid changes.

2. Apparatus for controlling the ratio of the flows of two fluids through conduits, comprising means connected to be operated by changes in the flows of the fluids to maintain the ratio substantially constant; a ratio varying device associated wtih said means; temperature responsive means exposed to the respective fluid flows; a Wheatstone bridge connected to said temperature responsive means, said Wheatstone bridge having a galvanometer and resistance thermometers comprising the temperature responsive means of which the resistance thermometers constitute two branches of the Wheatstone bridge and the other two branches being composed of variable resistances; and means to vary said variable resistances to balance the Wheatstone bridge and connected simultaneously to adjust the ratio varying device in such manner as to maintain a substantially constant ratio of weight flows.

3. Apparatus for controlling the ratio of the flows of two fluids through conduits, comprising means connected to be operated by changes in the flows of the fluids to maintain the ratio substantially constant; a ratio varying device associated with said means; temperature responsive means exposed to the respective fluid flows; and means associated with said temperature responsive means to adjust the ratio varying device to maintain a substantially constant ratio of weight flows as the absolute temperatures of both fluids change.

4. Apparatus for controlling the ratio of the flows of two fluids through conduits, comprising means connected to be operated by changes in the flows of the fluids to maintain the ratio substantially constant; a ratio varying device associated with said means; temperature responsive means exposed to the respective fluid flows; a Wheatstone bridge connected to said temperature responsive means, said Wheatstone bridge having a galvanometer and thermocouples comprising the temperature responsive means of which the thermocouples constitute two branches of the Wheatstone bridge and the other two branches being composed of variable resistances; and means to vary said variable resistances to balance the Wheatstone bridge and connected simultaneously to adjust the ratio varying device, in such manner as to maintain a substantially constant ratio of weight flows.

5. Apparatus for maintaining a constant ratio of two fluids each in a separate conduit, of which each conduit has a restriction, comprising a volumetric ratio control device, including a valve in one of said conduits operated to maintain a constant ratio of differentials across the two restrictions, a ratio varying device also associated with said control device, a potentiometer to measure the ratio between the absolute temperatures in the conduits; and means for changing the setting of the ratio varying device in accordance with the indication of the potentiometer in a manner to maintain a constant ratio of weight flows as the absolute temperatures of the fluids vary.

6. Apparatus for controlling the ratio of the flows of two fluids through conduits, comprising means connected to be operated by changes in the flows of the fluids to maintain the ratio substantially constant; a ratio varying device associated with said means; temperature responsive means exposed to the respective fluid flows; and means controlled by said temperature responsive means connected and arranged to automatically adjust the ratio varying device to maintain a substantially constant ratio of weight flows as the absolute temperature of at least one fluid changes.

7. Apparatus for controlling the ratio of the flows of two fluids through conduits, comprising means connected to be operated by changes in the flows of the fluids to maintain the ratio substantially constant; a ratio varying device associated with said means; temperature responsive means, including elements exposed to the fluid flows; and means connected to be operated by the temperature responsive means to adjust the ratio varying device to maintain a substantially constant ratio of weight flows as the difference of the temperatures changes.

HERBERT ZIEBOLZ.
JOHN C. VAALER.